(12) United States Patent
Yu et al.

(10) Patent No.: US 10,152,587 B2
(45) Date of Patent: Dec. 11, 2018

(54) DEVICE PAIRING METHOD

(71) Applicant: WALTON ADVANCED ENGINEERING INC., Kaohsiung (TW)

(72) Inventors: Hong Chi Yu, Kaohsiung (TW); Mao Ting Chang, Kaohsiung (TW)

(73) Assignee: WALTON ADVANCED ENGINEERING INC., Kaohsiung (TW)

(*) Notice: Subject to any disclaimer, the term of this patent is extended or adjusted under 35 U.S.C. 154(b) by 139 days.

(21) Appl. No.: 15/259,133

(22) Filed: Sep. 8, 2016

(65) Prior Publication Data

US 2017/0255773 A1    Sep. 7, 2017

(30) Foreign Application Priority Data

Mar. 7, 2016 (TW) .............................. 105106875 A

(51) Int. Cl.

| | |
|---|---|
| *G06F 17/30* | (2006.01) |
| *G06F 21/45* | (2013.01) |
| *H04W 12/06* | (2009.01) |
| *H04L 29/06* | (2006.01) |
| *H04W 12/04* | (2009.01) |
| *H04W 84/12* | (2009.01) |

(Continued)

(52) U.S. Cl.
CPC ............ *G06F 21/45* (2013.01); *H04W 12/06* (2013.01); *H04L 63/18* (2013.01); *H04W 4/80* (2018.02); *H04W 12/04* (2013.01); *H04W 76/10* (2018.02); *H04W 84/12* (2013.01)

(58) Field of Classification Search
CPC .............. G06F 21/45; G06F 17/30082; G06F 17/30321; G06F 17/30486; G06F 17/30516; H04L 63/18; H04L 45/44; H04L 45/566; H04L 63/0428; H04L 63/06; H04L 9/0816; H04L 9/085; H04L 9/0894; H04W 12/04; H04W 12/06; H04W 4/80; H04W 76/10; H04W 84/12; H04W 88/02

See application file for complete search history.

(56) References Cited

U.S. PATENT DOCUMENTS

| | | | |
|---|---|---|---|
| 2010/0115108 A1* | 5/2010 | Wang .................... | H04W 8/265 709/228 |
| 2010/0128632 A1* | 5/2010 | Mantysalo .......... | H04M 1/6058 370/254 |

\* cited by examiner

*Primary Examiner* — Abiy Getachew
(74) *Attorney, Agent, or Firm* — Bacon & Thomas, PLLC

(57) ABSTRACT

A device pairing method relates to steps of transmitting authentication information to a second device from a first device via a physical connecting line. First, a connectivity interface on the second device is electrically connected to an authentication connectivity interface on the first device via a connecting line; second, the first device in the mode of the virtual authentication disk is electrically connected to the second device; third, authentication information in the virtual authentication disk is accessed by an application program of the second device; fourth, an electrical connection between the second device and the first device is disabled with the connecting line removed; finally, the first device is accessed by the application program of the second device when the authentication information is transmitted to a network interface on the first device through some wireless networks of the second device. As such, the first device as a network device for storage acquires access authentication safely; the first device as a multimedia device with Bluetooth connections exchange connectivity information quickly.

5 Claims, 5 Drawing Sheets

(51) Int. Cl.
*H04W 4/80* (2018.01)
*H04W 76/10* (2018.01)

DEVICE PAIRING METHOD

BACKGROUND OF THE INVENTION

1) Field of the Invention

The present disclosure relates to a device pairing method, particularly a method to transmit authorization information to one device via a physical connecting line and exchange data later via wireless telecommunications.

2) Description of the Prior Art

Individual electronic equipment popular with the general public makes users develop the custom of relying on all types of user-friendly electronic equipment in which various work information and/or private messages are left; however, the individual electronic equipment is still not perfect for information sharing.

To store all kind of information in electronic equipment safely, the authentication methods, major mechanisms of ensuring personal privacy, such as username/password mechanism, one-time password, and physical authentication key have been available; additionally, the pairing methods, minor mechanisms of ensuring access to an electronic device by another one or preventing electronic equipment from any unauthorized user's invasion, can be Wi-Fi protecting configurations, Bluetooth pairing, etc.

There have been several patents for authentication or pairing published as follows:

Patent No. TW 1519992 discloses a login authentication method, system and computer-based storage media wherein the method comprises steps as follows: a first client side issues a first login request to a login server and receives a mapping relation for initial characters and mapped characters returned by the login server; a second client side depending on the mapping relation issues a second login request including information based on the mapped relation and corresponding to a user to the login server. In Patent No. TW 1519992, a login is completed by two client sides collectively and no specific user information is retrieved from one client side which has been infected by computer viruses for good safety of login authentication and protection of user information.

Patent No. TW 1520653 discloses an auto-matching method of wireless security, method of establishing connections, and wireless access points for an electronic device automatically matching and linking a wireless AP (Access Point) device wherein the auto-matching method of wireless security comprises steps as follows: an electronic device links a wireless AP device; the electronic device transmits a network ID to the wireless AP device; the electronic device receives a network name and a password from the wireless AP device; the connection between the electronic device and the wireless AP device is disabled; the electronic device issues a connection request with the network ID, the network name, and the network password included to the wireless AP device; a connection between the electronic device and the wireless AP device is established.

Patent No. TW 1506987 discloses a communications terminal which comprises a request unit, a light-emitting unit, an inspection unit, a video unit, an analyst unit and a pairing unit. The request unit issues a pairing signal when a communications pairing function is enabled by a user; the light-emitting unit emits specific light rays when a communications pairing function is enabled by a user; the inspection unit checks any pairing signal from another communications terminal and issues a video signal with the pairing signal from another communications terminal received; the video unit reacts to the video signal and enables a camera to shoot the light-emitting unit of another communications terminal; the analyst unit analyzes images shot by the video unit; the pairing unit determines any specific parameters included in the images shot by the video unit for completion of communication pairing.

Patent No. TW 1467978 discloses secure pairing for wired or wireless communications devices wherein the secure pairing is established between a main communications device and a peripheral communications device for creation of a wireless or wired ad-hoc network. A unique device ID related to the peripheral device is shown on the main device. To receive the secure pairing, a user approves a device ID on the main device matching a device ID on the peripheral device and presses a button on the peripheral device or locates the peripheral device contacting or being adjacent to the main device (Near Field Communication (NFC) technology available in those peripheral and main devices) for completion of the pairing procedure. Thus, the secure pairing is created with no complicated user interface installed on the peripheral device.

However, security-related problems such as capture of wireless signals and failures of data exchanges due to interferences still exist because ordinary equipment relies on wireless transmission to exchange authentication and pairing information.

To settle the above problems, the patent applicant provides a device pairing method hereinafter.

SUMMARY OF THE INVENTION

In virtue of the above problems, a device pairing method in the present disclosure is to use a physical connecting line for connection of two devices and exchange but no divulgence of authentication and pairing information and further create wireless communications between the two devices.

A device pairing method in the present disclosure contributes to safe, convenient and effective communications.

A device pairing method in the present disclosure depends on a physical connecting line to exchange connectivity information and avoid selecting one device mistakenly amid a plurality of devices with the same device name in wireless environment.

A device pairing method in the present disclosure depends on a physical connecting line to exchange connectivity information and to provide each device with specific connectivity information for better safety.

A device pairing method in the present disclosure depends on wireless communications for data exchange and less restriction in use.

To this end, a device pairing method is embodied with technical measures as follows. The present disclosure relates to a device pairing method, particularly a method to transmit authentication information to a second device from a first device via a physical connecting line, and comprises following steps: a connectivity interface on a second device is electrically connected to an authentication connectivity interface on a first device via a connecting line; step b: the first device in the mode of a virtual authentication disk is electrically connected to the second device; step c: authentication information in the virtual authentication disk is accessed by an application program of the second device; step d: an electrical connection between the second device and the first device is disabled with the connecting line removed; step e: the first device is accessed by the application program of the second device when the authentication information is transmitted to a network interface on the first device through some wireless networks of the second device.

Moreover, a device pairing method depends on following technical measures to realize purposes and techniques.

In the device pairing method, the first device is a network device for storage or a multi-media device with Bluetooth connections.

In the device pairing method, the second device is a network device for wireless access.

In the device pairing method, data for the wireless networks of the second device is rewritten into the virtual authentication disk after step c.

In the device pairing method, the authentication information is stored in a storage space of the second device after step c.

In the device pairing method, the authentication information in the mode of the virtual authentication disk is rewritten by the storage device after step e.

In the device pairing method, the connectivity interface and the connecting line conform to USB OTG criteria.

In the device pairing method, the mode of the virtual authentication disk is in conformity with USB mass storage device class criteria.

In the device pairing method, the authentication information is encrypted information.

In contrast to conventional methods, a device pairing method in the present disclosure is effective in: (1) promotion of a successful connection based on a physical connecting line for data exchange; (2) better compatibility due to application of a universal serial bus interface; (3) less network safety risk due to a physical connecting line for data exchange.

BRIEF DESCRIPTIONS OF THE DRAWINGS

DETAILED DESCRIPTIONS OF THE PREFERRED EMBODIMENTS

Figure 3:
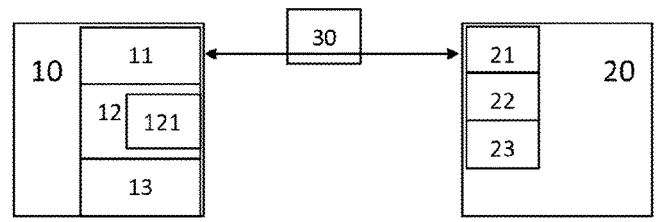
FIG. 3 is the first schematic view for a device pairing method in a preferred embodiment.

A device pairing method will be further illustrated in preferred embodiments for clear understanding of purposes, characteristics and effects:

FIGS. 1, 3, 4 and 5 illustrate a device pairing method in the first embodiment. Referring to FIG. 3, which illustrates: a first device (10) comprises an authentication connectivity interface (11), a virtual authentication disk (12) and a network interface (13); a second device (20) comprises a connectivity interface (21), an application program (22) and some wireless networks (23); the first device (10) and the second device (20) are electrically connected to each other via a connecting line (30).

Specifically, the authentication connectivity interface (11), the connectivity interface (21) and the connecting line (30) are in conformity with Universal Serial Bus (USB) standards; the connectivity interface (21) and the connecting line (30) conform to USB On-The-Go (USB OTG) criteria, which allow a USB peripheral device to be transformed to a USB host and link/communicate with other USB peripheral devices; the mode of the virtual authentication disk (12) is effective in data access to storage spaces in the first device (10) which conforms to USB mass storage device class for an electrical connection between the authentication connectivity interface (11) and an external USB host.

Furthermore, the network interface (13) is an Ethernet interface or a wireless network interface with the function of multi-peer data transmission/exchange on common fast Ethernet (100 BASE-T, 1000 BASE-T standards) or WLAN; some wireless networks (23) denote some wireless network interfaces such as Wi-Fi or Bluetooth for data exchange through a non-physical link without limits of service environment.

In the device pairing method, the application program (22) is a program run in memories, particularly a resident program run in system memories and presented in a main interface after activation; the application program (22) has a function to read configurations for each network interface of the first device (10) and setup the configurations in the second device (20).

As shown in previous descriptions, the first device (10) is a network device for storage or a multimedia device with Bluetooth connections: the network device for storage is usually a Network Attached Storage (NAS) device; the multimedia device with Bluetooth connections is a Bluetooth earphone or a Bluetooth speaker; the second device (20) can be a network device for wireless access such as smart phone.

Figure 1:
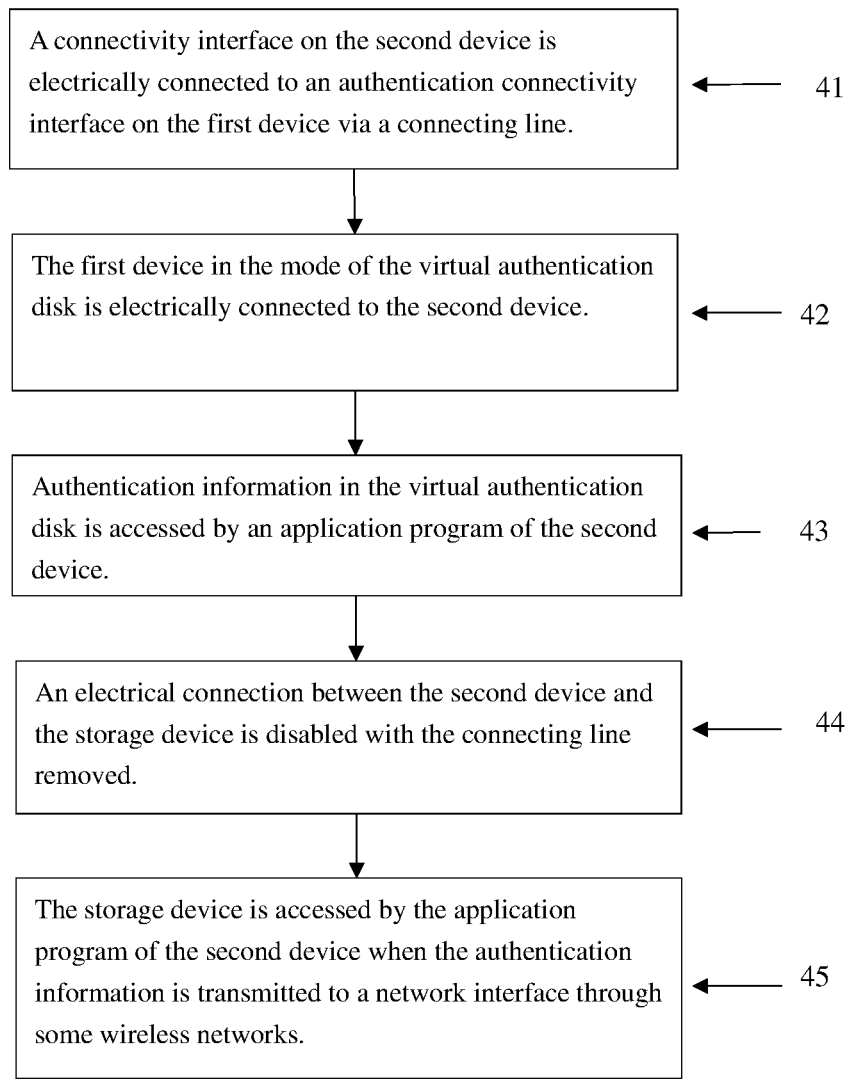
FIG. 1 is the first flowchart for a device pairing method in a preferred embodiment.

Referring to step a (41) in FIG. 1, which illustrates a connectivity interface (21) on the second device (20) is electrically connected to an authentication connectivity interface (11) on the first device (10) via a connecting line (30).

As shown in the example in FIG. 3, a smart phone as the second device (20) relies on a Universal Serial Bus (USB) representing the connectivity interface (21) to electrically link the connecting line (30); the Universal Serial Bus (USB) conforms to either Micro-USB 2.0 Type B connector standards or USB 3.1 Type C connector standards.

Moreover, the connecting line (30) is in conformity with USB On-The-Go (USB OTG) criteria, for example, the connecting line (30) has one end according with Micro-USB 2.0 Type B connector standards or USB 3.1 Type C connector standards and the other end according with USB 2.0 Type A connector standards or USB 3.1 Type C connector standards; a Network Attached Storage (NAS) device as the first device (10) relies on a Universal Serial Bus (USB) representing the authentication connectivity interface (11) to electrically link the connecting line (30); the Universal Serial Bus (USB) conforms to either Micro-USB 2.0 Type B connector standards or USB 3.1 Type C connector standards Referring to step b (42) in FIG. 1, which illustrates the first device (10) in the mode of the virtual authentication disk (12) is electrically connected to the second device (20).

Specifically, the mode of the virtual authentication disk (12) provides specific data exchange space in which data to be exchanged by the first device (10) or the second device

(20) is saved for convenient write-in, read and rewrite; moreover, the virtual authentication disk (12) is an electromagnetic storage component which is able to present digitalized data via a controller and an operating system.

Referring to step b (42) in FIG. 1, which illustrates authentication information (121) in the virtual authentication disk (12) is accessed by an application program (22) in the second device (20).

Specifically, after the authentication information (121) saved in the virtual authentication disk (12) and comprising network-related information in the first device (10) is accessed by the application program (22), the second device (20) links the first device (10), as shown in FIG. 3; preferably, the authentication information (121) is encrypted information.

Figure 4:
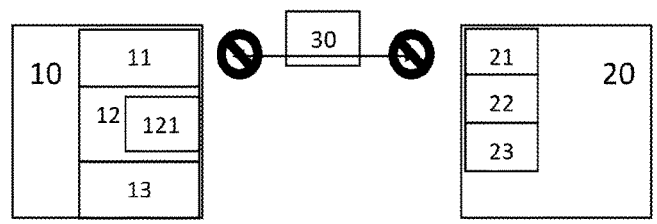
FIG. 4 is the second schematic view for a device pairing method in a preferred embodiment.

Furthermore, referring to step c (43) in FIG. 1 and FIG. 4, which illustrate an electrical connection between the second device (20) and the first device (10) is disabled with the connecting line (30) removed.

Figure 5:
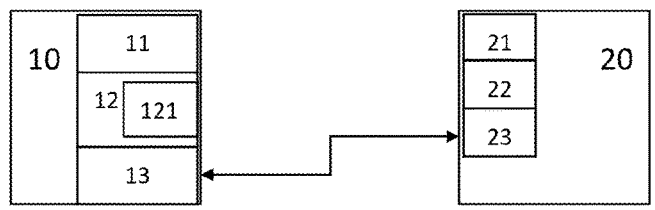
FIG. 5 is the third schematic view for a device pairing method in a preferred embodiment.
Figure 6:
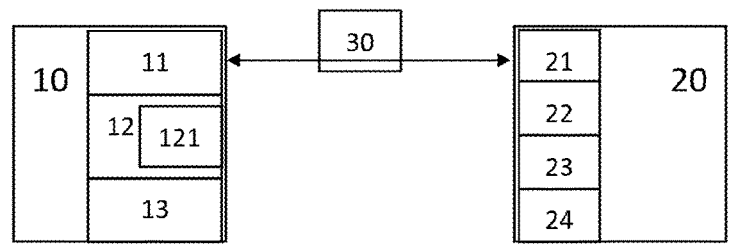
FIG. 6 is the fourth schematic view for a device pairing method in a preferred embodiment.
Figure 7:
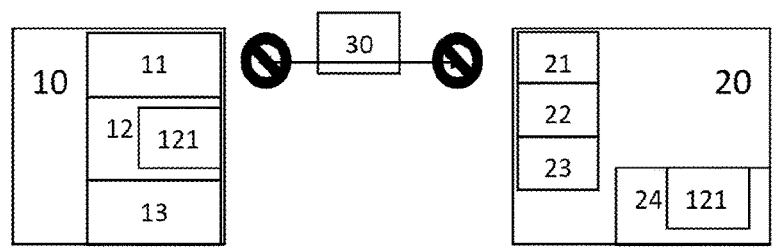
FIG. 7 is the fifth schematic view for a device pairing method in a preferred embodiment.

Finally, referring to step d (44) in FIG. 1 and FIG. 5, which illustrate the authentication information (121) is transmitted to a network interface (13) on the first device (10) by the application program (22) in the second device (20) through some wireless networks (23) of the second device (20) and the first device (10) is accessed.

Here is an example for the above procedure. First, the second device (20) is a smart phone, the first device (10) is a Network Attached Storage (NAS) device, and the specific application program (22) accesses a storage space in the first device (10) with the authentication information (121), which is approved at the network interface (13) on the first device (10) (for a wireless or wired network) through the wireless network (23) (Wi-Fi network) of the second device (20); second, the second device (20) is a smart phone, the first device (10) is a Bluetooth earphone, and the specific application program (22) embodies sound output from the second device (20) to the first device (10) when the authentication information (121) is approved at the network interface (13) on the first device (10) (Bluetooth interface) through the wireless network (23) of the second device (20) (Bluetooth network).

Referring to FIGS. 2, 6, 7, 8 and 9, which illustrate a device pairing method in the second embodiment in which the symbols identical to those of the first embodiment in FIGS. 1, 3, 4 and 5 are not explained hereinafter. The differences in the second embodiment differing from the first embodiment are some extra steps, step c1 (431) and step c2 (432), added between step c (43) and step d (44) and step e1 (451) added after step e (45).

Figure 2:
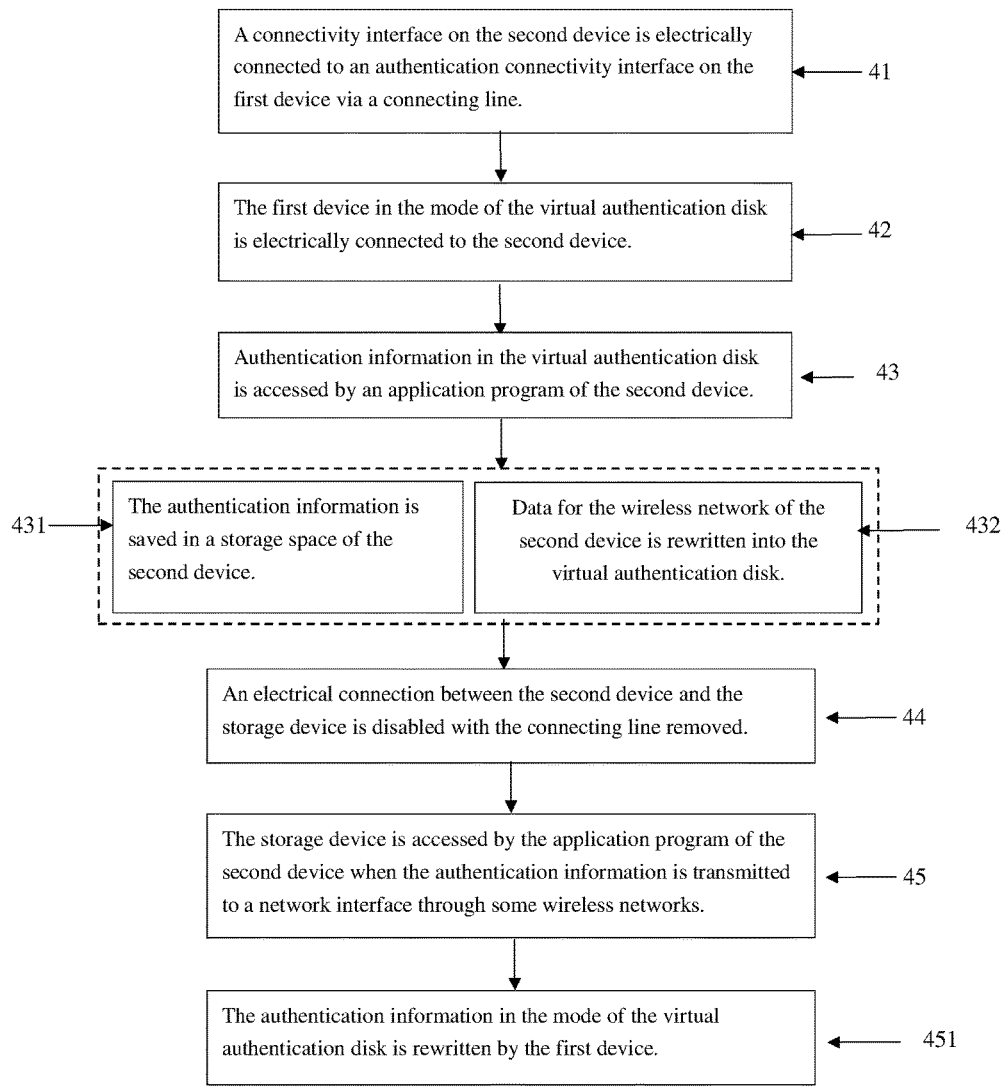
FIG. 2 is the second flowchart for a device pairing method in a preferred embodiment.

As shown in FIG. 2, step a (41), step b (42) and step c (43) in the second embodiment are not changed and described as the first embodiment.

Step c1 (431) and step c2 (432) are further described as follows: step c1 (431): the authentication information (121) is saved in a storage space (24) of the second device (20); step c2 (432): data for the wireless network (23) of the second device (20) is rewritten into the virtual authentication disk (12).

In the device pairing method, step c1 (431) is to skip some previous steps when the second device (20) links the first device (10) again; the storage space (24) denotes an electromagnetic storage formation which is able to store and present digitalized data via a controller or an operating system; step c2 (432) is to promote safety and support the first device (10) to identify a device using the authentication information (121) as the second device (20).

Furthermore, step d (44) and step e (45) in FIG. 2 are not changed and described as the first embodiment.

Step e1 (451) in FIG. 2: the authentication information (121) in the mode of the virtual authentication disk (12) is rewritten by the first device (10).

Figure 8:
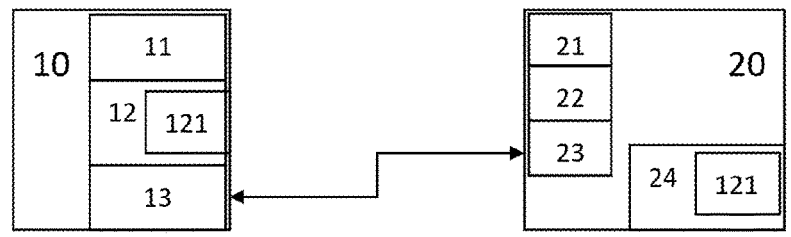
FIG. 8 is the sixth schematic view for a device pairing method in a preferred embodiment.
Figure 9:
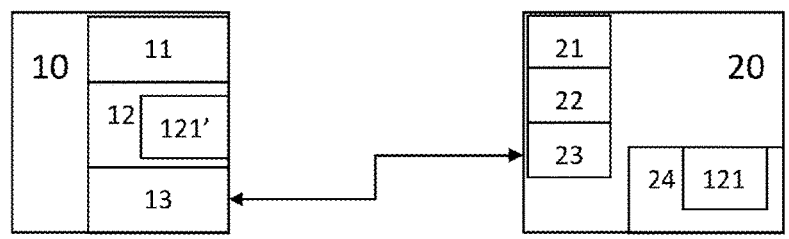
FIG. 9 is the seventh schematic view for a device pairing method in a preferred embodiment.

In practice, step e1 (451) along with step c2 (432) support the first device (10) to identify a connected device and prevent any user who was not authorized initially from using the authentication information (121) for authentication. As shown in FIGS. 8 and 9, step e1 (451) is to rewrite the authentication information (121) in the mode of the virtual authentication disk (12) into authentication information (121') for next device pairing.

Accordingly, a device pairing method differing from ordinary device pairing methods and referred to as creative work meets patentability and is applied for the patent.

It should be reiterated that the above descriptions present the preferred embodiment, and any equivalent change in specifications, claims, or drawings still belongs to the technical field within the present disclosure with reference to claims hereinafter.

What is claimed is:

1. A device pairing method for authentication information transmitted to a second device (20) from a first device (10) via a physical connecting line, comprising steps as follows:
    step a: a connectivity interface (21) on a second device (20) is electrically connected to an authentication connectivity interface (11) on a first device (10) via a connecting line (30);
    step b: the first device (10) in the mode of a virtual authentication disk (12) provides provides specific data exchange space in which data to be exchanged by the first device (10) or the second device (20) is saved for convenient write-in, read and rewrite and is electrically connected to the second device (20);
    step c: after an encrypted authentication information (121) saved in the virtual authentication disk (12) and comprising network-related information in the first device (10) is accessed by an application program (22) of the second device (20) then the second device (20) links the first device (10);
    step c1: the authentication information (121) is saved in a storage space (24) of the second device (20) to skip some previous steps when the second device (20) links the first device (10) again;
    step c2: data for the wireless network (23) of the second device (20) is rewritten into the virtual authentication disk (12) to promote safety and support the first device (10) to identify a device using the authentication information (121) as the second device (20);
    step d: an electrical connection between the second device (20) and the first device (10) is disabled with the connecting line (30) removed;
    step e: the first device (10) is accessed by the application program (22) of the second device (20) when the authentication information (121) is transmitted to a network interface (13) on the first device (10) through some wireless networks (23) of the second device (20);
    step e1: the authentication information (121) in the mode of the virtual authentication disk (12) is rewritten into authentication information (121') for next device pairing.

2. A device pairing method as claimed in claim 1 wherein the first device (10) is a network device for storage or a multi-media device with Bluetooth connections.

3. A device pairing method as claimed in claim 1 wherein the second device (20) is a network device for wireless access.

4. A device pairing method as claimed in claim 1 wherein the connectivity interface (21) and the connecting line (30) conform to USB OTG criteria.

5. A device pairing method as claimed in claim 1 wherein the mode of the virtual authentication disk (12) is in conformity with USB mass storage device class criteria.

\* \* \* \* \*